US009169793B2

(12) United States Patent
Jung

(10) Patent No.: US 9,169,793 B2
(45) Date of Patent: Oct. 27, 2015

(54) METHOD FOR CONTROLLING ENGINE NOISE INCLUDING COMBUSTION NOISE OF INTERNAL COMBUSTION ENGINE

(71) Applicant: Hyundai Motor Company, Seoul (KR)

(72) Inventor: Insoo Jung, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 372 days.

(21) Appl. No.: 13/678,241

(22) Filed: Nov. 15, 2012

(65) Prior Publication Data

US 2014/0012487 A1 Jan. 9, 2014

(30) Foreign Application Priority Data

Jul. 3, 2012 (KR) ........................ 10-2012-0072120

(51) Int. Cl.
  *F02M 7/00* (2006.01)
  *F02D 41/30* (2006.01)
  *F02D 41/40* (2006.01)
  *F02D 35/02* (2006.01)
  *F02D 41/28* (2006.01)

(52) U.S. Cl.
  CPC .............. *F02D 41/30* (2013.01); *F02D 35/023* (2013.01); *F02D 41/403* (2013.01); *F02D 2041/288* (2013.01); *F02D 2200/025* (2013.01); *Y02T 10/44* (2013.01)

(58) Field of Classification Search
  CPC ............ F02D 2200/025; F02D 41/402; F02D 41/403; G01L 23/22; F05D 2260/96
  USPC .................. 123/435, 436; 701/102–105, 111; 73/114.02, 114.03, 114.07, 114.08, 73/114.16, 114.17
  See application file for complete search history.

(56) References Cited

U.S. PATENT DOCUMENTS

| 5,056,487 | A | * | 10/1991 | Yamakado et al. ............ 123/436 |
| 5,836,285 | A | * | 11/1998 | Aoki et al. ................ 123/406.37 |
| 6,378,487 | B1 | | 4/2002 | Zukouski et al. |
| 7,395,148 | B2 | * | 7/2008 | Haraguchi et al. ............ 701/104 |
| 8,051,828 | B2 | * | 11/2011 | Sengupta et al. ............. 123/304 |
| 2003/0127073 | A1 | * | 7/2003 | Buck et al. ..................... 123/435 |

(Continued)

FOREIGN PATENT DOCUMENTS

| JP | 2008-184915 A | 8/2008 |
| JP | 2010-285883 A | 12/2010 |

(Continued)

*Primary Examiner* — Thomas Moulis
*Assistant Examiner* — Joseph Dallo
(74) *Attorney, Agent, or Firm* — Morgan, Lewis & Bockius LLP

(57) ABSTRACT

A method for controlling noise including combustion noise of an internal combustion engine includes (a) setting an engine noise target value and a cylinder pressure level target value, (b) determining a first comparison value by subtracting a measured cylinder pressure level from the cylinder pressure level, (c) receiving an engine noise parameter stored in an ECU, (d) determining the engine noise using the engine noise measured at step (c), (e) determining a direct correlation coefficient, an indirect correlation coefficient, mechanical noise, and flow noise through a proportional integral controller, (f) performing correction, (g) controlling the engine based on the value decided at step (f), (h) measuring a combustion pressure after step (g), (i) converting the combustion pressure into a cylinder pressure level within a predetermined crank angle after step (g), and (j) determining direct combustion noise of the engine noise after step (h).

5 Claims, 4 Drawing Sheets

(56) References Cited

U.S. PATENT DOCUMENTS

| | | | |
|---|---|---|---|
| 2004/0117106 A1* | 6/2004 | Dudel et al. | 701/115 |
| 2005/0149234 A1* | 7/2005 | Vian et al. | 700/279 |
| 2007/0101965 A1* | 5/2007 | Asahara et al. | 123/192.1 |
| 2007/0119413 A1* | 5/2007 | Lewis et al. | 123/295 |
| 2008/0114525 A1* | 5/2008 | Sugimoto | 701/103 |
| 2008/0276904 A1* | 11/2008 | Surnilla et al. | 123/406.45 |
| 2009/0100920 A1* | 4/2009 | Sakayanagi | 73/114.15 |
| 2010/0206267 A1* | 8/2010 | Glugla et al. | 123/406.26 |
| 2011/0093186 A1* | 4/2011 | Hagari et al. | 701/111 |
| 2011/0153182 A1* | 6/2011 | Sasaki | 701/111 |
| 2011/0305347 A1* | 12/2011 | Wurm | 381/71.1 |
| 2012/0004826 A1* | 1/2012 | Shimo et al. | 701/103 |
| 2012/0014838 A1* | 1/2012 | Yasui et al. | 422/105 |
| 2012/0048234 A1* | 3/2012 | Hamama et al. | 123/436 |
| 2012/0089315 A1* | 4/2012 | Makino et al. | 701/102 |
| 2012/0095668 A1* | 4/2012 | Landsmann et al. | 701/103 |

FOREIGN PATENT DOCUMENTS

| | | |
|---|---|---|
| KR | 10-0534725 B1 | 12/2005 |
| KR | 10-2011-0062412 A | 6/2011 |
| KR | 10-2012-0008668 A | 2/2012 |

* cited by examiner

FIG.3

| TARGET VALUE | 1250rpm | | | | |
|---|---|---|---|---|---|
| | 2bar | 3bar | 4bar | 5bar | 6bar |
| CPL | 161.9 | 161.7 | 165.9 | 171.7 | 169.6 |
| ENGINE NOISE | 70.4 | 70.7 | 71.7 | 74.7 | 73.7 |
| (CPL-ENGINE NOISE) | 91.5 | 91.0 | 94.2 | 97.0 | 95.9 |

METHOD FOR CONTROLLING ENGINE NOISE INCLUDING COMBUSTION NOISE OF INTERNAL COMBUSTION ENGINE

CROSS-REFERENCE(S) TO RELATED APPLICATIONS

The present application claims priority to Korean Patent Application No. 10-2012-0072120 filed on Jul. 3, 2012, the entire contents of which is incorporated herein for all purposes by this reference.

BACKGROUND OF THE INVENTION

1. Field of the Invention

Exemplary embodiments of the present invention relate to a method for controlling engine noise including combustion noise of an internal combustion engine; and, particularly, to a method for controlling engine noise including combustion noise of an internal combustion engine, which reflects indirect combustion noise, mechanical noise, flow noise and the like, which occur in the engine, into target engine noise, and controls an injection variable of the engine with respect to engine noise and a cylinder pressure level, thereby controlling the engine noise.

2. Description of Related Art

In general, during combustion control of an internal combustion engine, a fuel injection mode is switched depending on the operation state of the internal combustion engine.

That is, a first injection mode to perform first and second pilot injections prior to a main injection and a second injection mode to perform the main injection are selected depending on the operation state of the internal combustion engine. According to the selected fuel injection mode, the fuel injection is performed.

Therefore, there exist various change patterns of a desirable heat release rate, and the heat release rate may significantly differ depending on the operation state of the internal combustion engine.

In particular, a crank angle at which the heat release rate based on combustion pressure approaches 50% is referred to as MFB50 (Mass Fraction Burned 50%), and the MFB50 is used as a determination standard of the combustion control.

However, in the conventional combustion control method, the measured combustion pressure, the crank angle recognized by an ECU, and the maximum pressure generation time are detected and used for control.

The conventional combustion control method controls the combustion stability only through the injection time, and cannot control engine noise including combustion noise.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling engine noise including combustion noise of an internal combustion engine.

In an aspect of the present invention, a method for controlling noise including combustion noise of an engine, may include (a) setting an engine noise target value and a cylinder pressure level target value, (b) receiving an engine noise parameter stored in an Engine Control Unit (ECU), (c) determining an engine noise using the engine noise parameters measured at step (b), (d) determining a first comparison value by subtracting the determined engine noise or a cylinder pressure level from the engine noise target value or the cylinder pressure level target value respectively, (e) determining a direct correlation coefficient, an indirect correlation coefficient, mechanical noise, and flow noise through a proportional integral controller, (f) performing correction of the determined engine noise using a pilot fuel amount, a pilot interval, a main injection time, and an injection variable of an injection pressure, which are previously set, based on the values determined at step (e), (g) controlling the engine based on value decided at step (f), (h) measuring a combustion pressure after step (g), (i) processing the combustion pressure through FFT (Fast Fourier Transformation) and converting the processed combustion pressure into the cylinder pressure level within a predetermined crank angle after step (g), and (j) determining direct combustion noise of the engine noise after step (h).

The engine noise target value and the pressure level target value at step (a) are set by applying a fuel amount, an engine rpm, a gear position, an injection variable, an intake temperature, and a cooling water temperature.

The engine noise at step (c) is determined by adding the direct combustion noise, an indirect combustion noise, the mechanical noise, and the flow noise.

At step (b), the engine noise parameter may include an engine torque, the engine rpm, the gear position, the injection variable, the intake air temperature, and the cooling water temperature.

The direct combustion noise is obtained by multiplying a direct combustion noise correlation coefficient by the cylinder pressure level, wherein the indirect combustion noise is obtained by multiplying a correlation coefficient by the square of a measured engine torque.

The method may further include determining a second comparison value by subtracting the determined engine noise or the measured cylinder pressure level from the engine noise target value or the cylinder pressure level target value respectively, and determining a third comparison value corresponding to a difference between the first and second comparison values.

A regression method is used at step (e).

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a table showing a difference value of FIG. 2.

Figure 1:
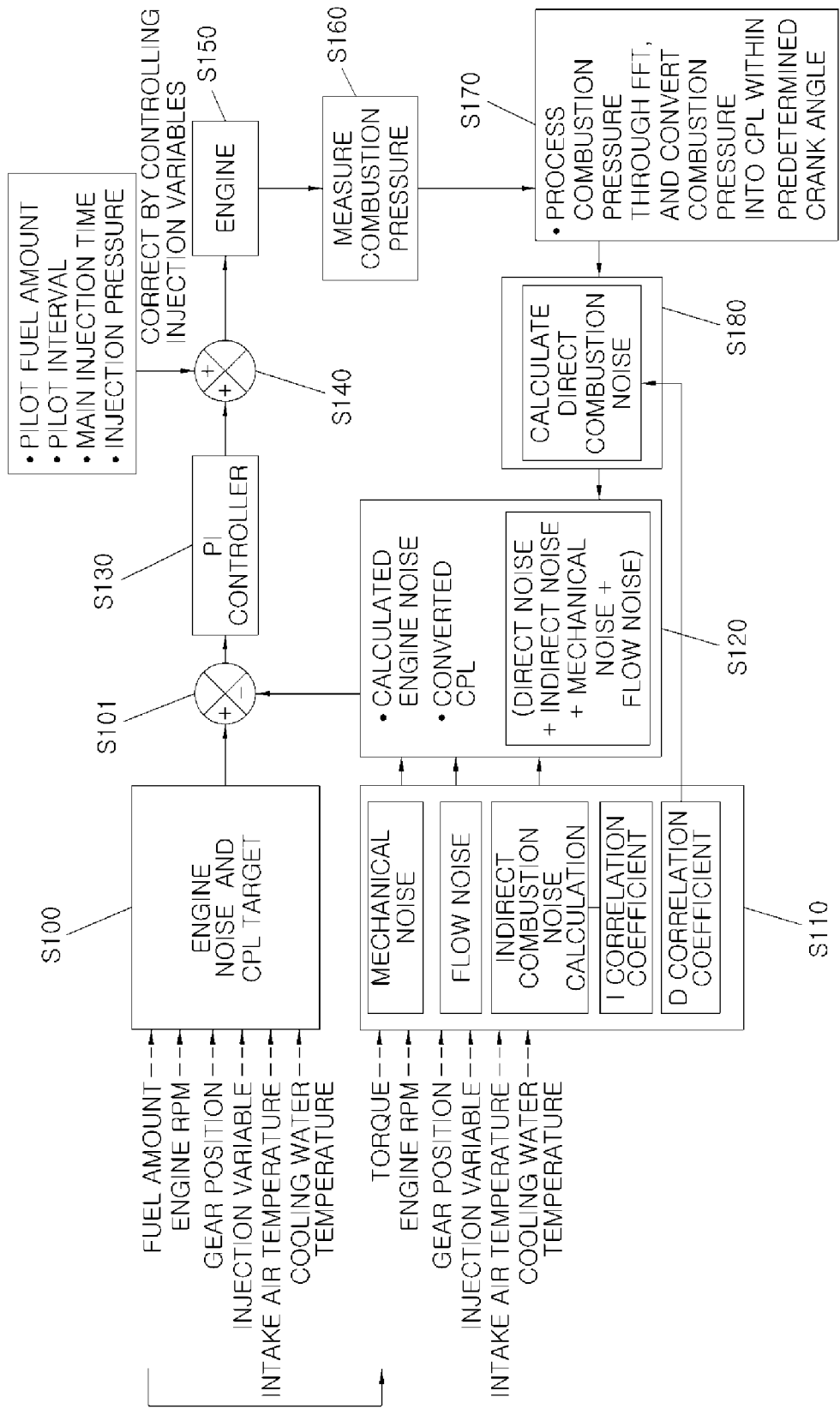
FIG. 1 is a flow chart schematically showing a method for controlling noise including combustion noise of an internal combustion engine in accordance with an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a flow chart schematically showing a method for controlling noise including combustion noise of an internal combustion engine in accordance with an exemplary embodiment of the present invention. Referring to FIG. 1, the method for controlling noise including combustion noise of an internal combustion engine in accordance with an exemplary embodiment of the present invention first sets an engine noise target value and a cylinder pressure level target value at step S100. Here, the engine noise target value and the pressure level target value may be set using an fuel amount, an engine rpm, a gear position, an injection variable, an intake air temperature, and a cooling water temperature, which are provided by an engine control unit (ECU), and an engine torque may be acquired from the engine noise target value and the pressure level target value.

Then, a first comparison value is calculated by subtracting a measured value of the cylinder pressure level from the target value of the cylinder pressure level at step S101.

Then, engine noise parameters stored in the ECU are received at step S110. Here, the engine noise parameters may include an engine torque, an engine rpm, a gear position, an injection variable, an intake air temperature, and a cooling water temperature. Furthermore, the engine noise may be calculated using the engine noise parameters at step S120. Here, the engine noise may include direct combustion noise, indirect combustion noise, mechanical noise, and flow noise. At this time, the mechanical noise indicates mechanical noise occurring during crank rotation, the flow noise indicates noise occurring while gas passes through an intake/exhaust manifold, the indirect combustion noise indicates piston slap noise and radial noise of a cylinder crank case and a chain cover, caused by vibration transmitted through a piston, a connecting rod, and a main bearing, and the direct combustion noise indicates noise caused by combustion pressure vibration.

Then, the engine noise parameters measured at step S110 are used to calculate engine noise at step S120. At this time, the engine noise is calculated by adding the direct noise, the indirect noise, the mechanical noise, and the flow noise.

Then, a direct correlation coefficient D, an indirect correlation coefficient I, the mechanical noise, and the flow noise may be calculated through a proportional-integral controller at step S130. The result values are then applied to calculate the engine noise.

Based on the values calculated at step S130, the engine noise is corrected using a pilot fuel amount, a pilot interval, a main injection time, and an injection variable of an injection pressure at step S140.

Then, the engine is controlled based on the value decided at step S140.

Then, after step S150, a combustion pressure is measured at step S160.

The combustion pressure is processed by FFT (Fast Fourier Transformation) and converted into a cylinder pressure level within a predetermined crank angle at step S170. Accordingly, the cylinder pressure level is expressed in unit of dB.

Then, the direct combustion noise of the engine noise is calculated at step S180.

Figure 2:
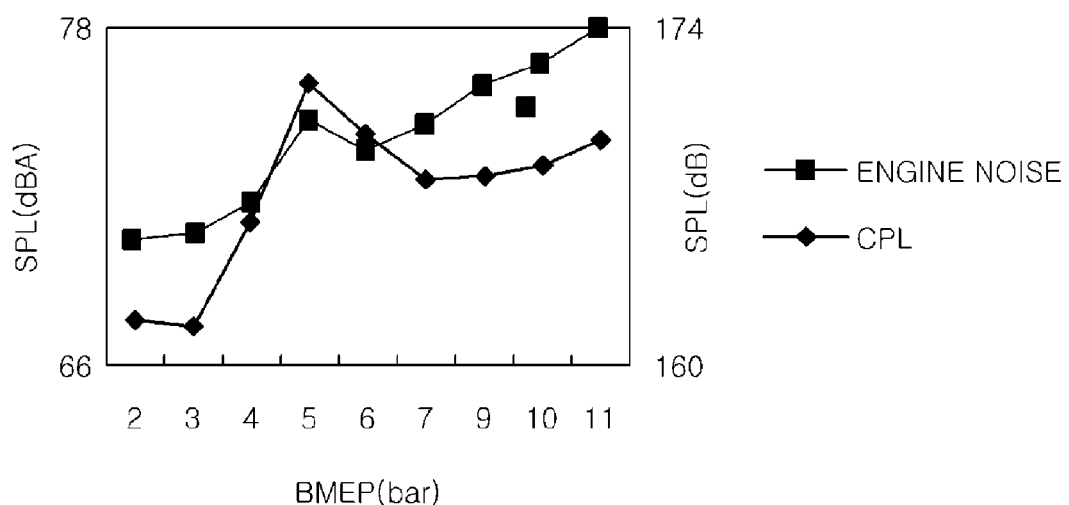
FIG. 2 is a graph illustrating engine noise and a cylinder pressure level which are applied to the method for controlling noise including combustion noise of an internal combustion engine in accordance with the exemplary embodiment of the present invention.

FIG. 2 is a graph illustrating the engine noise and the cylinder pressure level which are applied to the method for controlling noise including combustion noise of an internal combustion engine in accordance with the exemplary embodiment of the present invention. FIG. 2 shows a first comparison value obtained by subtracting the measured value of the engine noise from the target value of the engine noise and a second comparison value obtained by subtracting the calculated value of the cylinder pressure level from the target value of the cylinder pressure level. Here, the waveform may be separated for each frequency by processing the measured cylinder pressure through the FFT. That is, the cylinder pressure is converted into the cylinder pressure level, and overall levels for a specific frequency range are calculated.

FIG. 3 is a table including a third comparison value corresponding to a difference between the first and second comparison values. That is, although the injection variable may be corrected based on the first comparison value, the third value corresponding to a difference between the first and second comparison values may be calculated, and the injection variable may be corrected based on the third comparison value.

Figure 4:
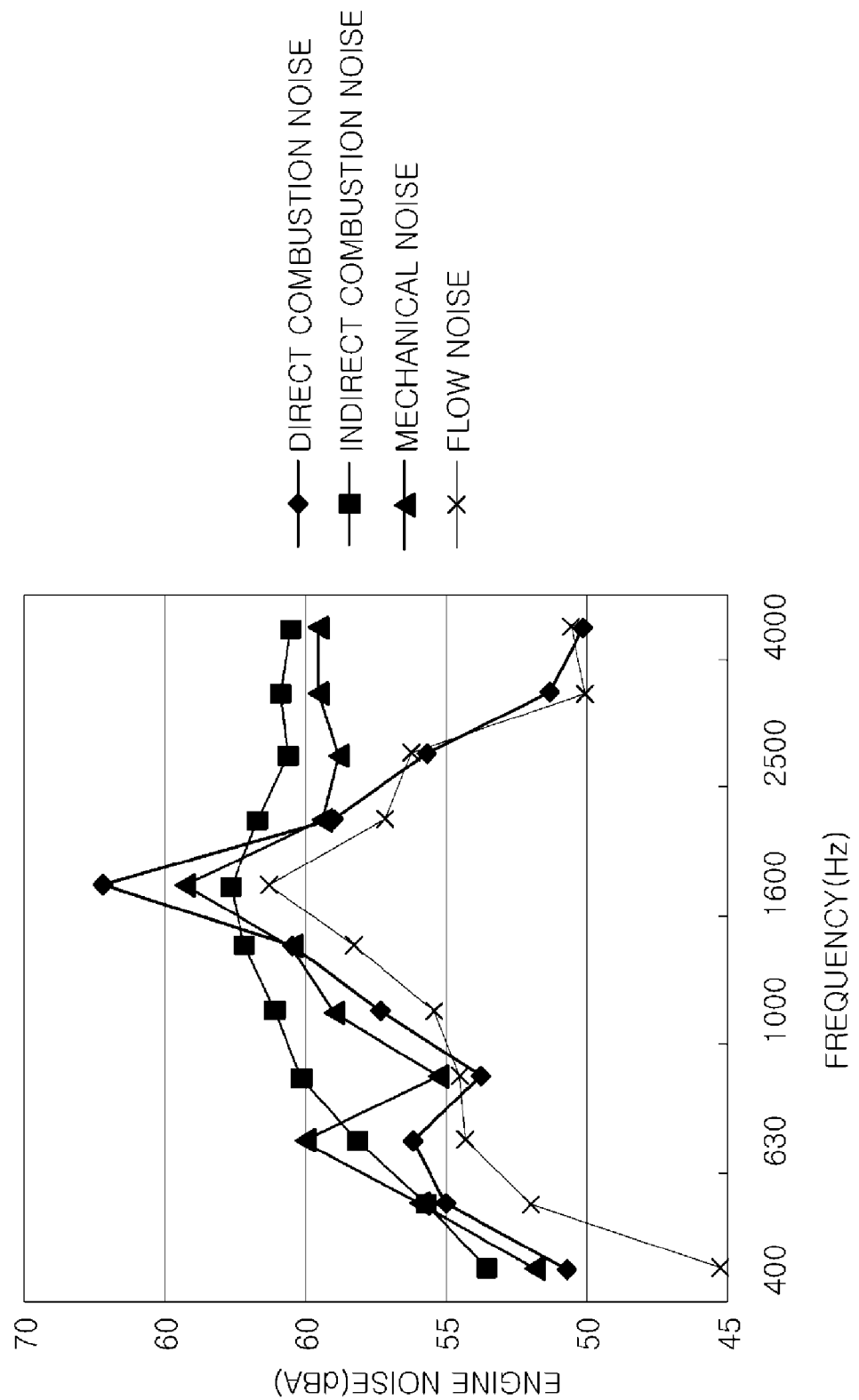
FIG. 4 is a graph illustrating the engine noise measured by the method for controlling noise including combustion noise of an internal combustion engine in accordance with the exemplary embodiment of the present invention.

FIG. 4 is a graph illustrating the engine noise measured by the method for controlling noise including combustion noise of an internal combustion engine in accordance with the exemplary embodiment of the present invention. FIG. 4 shows the measured values of the direct noise, the indirect noise, the mechanical noise, and the flow noise. Here, the combustion pressure, the engine noise, and the engine torque are measured for the engine. For example, a test of accelerating the engine for one minute may be performed while the engine rpm is fixed at an interval of 250 rpm in the range of 1000 to 4000 rpm and the acceleration pedal is operated in the range of 0 to 100%. Furthermore, the mechanical noise may be measured by a motoring test, and the flow noise may be measured by an intake system and an exhaust system.

At this time, the engine noise may be calculated by adding the direct noise, the indirect noise, the mechanical noise, and the flow noise, and a regression method may be used through the proportional integral controller at step S130.

First, the direct combustion noise correlation coefficient D, the indirect combustion noise correlation coefficient I, the mechanical noise, and the flow noise are stored in the ECU using the fuel amount, the engine rpm, the gear position, the intake air temperature, and the cooling water temperature which are acquired through a previously-performed development test for each engine. Here, the direct combustion noise may be obtained by multiplying the direct combustion noise correlation coefficient by the cylinder pressure level. Furthermore, the indirect combustion noise may be obtained by multiplying the correlation coefficient I by the square of the measured engine torque. Furthermore, the engine noise may be obtained by adding the direct combustion noise, the indirect combustion noise, the mechanical noise, and the flow noise.

That is, the direct correlation coefficient, the indirect correlation coefficient, the mechanical noise, and the flow noise are calculated, and the engine noise is obtained based on the calculated values, and then corrected by controlling the pilot fuel amount, the pilot interval, the main injection time, and the injection variable of the injection pressure, which are given by the ECU.

In accordance with the exemplary embodiment of the present invention, the method for controlling noise including combustion noise of an internal combustion engine may perform feedback control on the engine noise.

Furthermore, the method may prevent the noise deviation of the engine and the degradation of the engine noise based on the deterioration of the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling noise including combustion noise of an engine, comprising:
    (a) setting an engine noise target value and a cylinder pressure level target value;
    (b) receiving an engine noise parameter stored in an Engine Control Unit (ECU);
    (c) determining an engine noise using the engine noise parameters received at step (b);
    (d) determining a first comparison value by subtracting the determined engine noise or a cylinder pressure level from the engine noise target value or the cylinder pressure level target value respectively;
    (e) determining a direct correlation coefficient, an indirect correlation coefficient, mechanical noise, and flow noise through a proportional integral controller;
    (f) performing correction of the determined engine noise using a pilot fuel amount, a pilot interval, a main injection time, and an injection variable of an injection pressure, which are previously set, based on the values determined at step (e);
    (g) controlling the engine based on value decided at step (f);
    (h) measuring a combustion pressure after step (g);
    (i) processing the combustion pressure through FFT (Fast Fourier Transformation) and converting the processed combustion pressure into the cylinder pressure level within a predetermined crank angle after step (g); and
    (j) determining direct combustion noise of the engine noise after step (h),
    wherein the engine noise at step (c) is determined by adding the direct combustion noise, an indirect combustion noise, the mechanical noise, and the flow noise,
    wherein the direct combustion noise is obtained by multiplying a direct combustion noise correlation coefficient by the cylinder pressure level, and
    wherein the indirect combustion noise is obtained by multiplying a correlation coefficient by the square of a measured engine torque.

2. The method of claim 1, wherein the engine noise target value and the pressure level target value at step (a) are set by applying a fuel amount, an engine rpm, a gear position, an injection variable, an intake temperature, and a cooling water temperature.

3. The method of claim 1, wherein, at step (b), the engine noise parameter includes an engine torque, the engine rpm, the gear position, the injection variable, the intake air temperature, and the cooling water temperature.

4. The method of claim 1, further including determining a second comparison value by subtracting the determined engine noise or the measured cylinder pressure level from the engine noise target value or the cylinder pressure level target value respectively, and determining a third comparison value corresponding to a difference between the first and second comparison values.

5. The method of claim 1, wherein a regression method is used at step (e).

* * * * *